Nov. 17, 1970 H. T. BRENDZEL 3,541,461

NONSATURATING TRANSFORMER AMPLIFIER

Filed Feb. 8, 1968 2 Sheets-Sheet 1

INVENTOR
H. T. BRENDZEL
BY C. E. Hirsch Jr.
ATTORNEY

United States Patent Office 3,541,461

Patented Nov. 17, 1970

3,541,461

NONSATURATING TRANSFORMER AMPLIFIER

Henry T. Brendzel, Parsippany, N.J., assignor to Bell Telephone Laboratories, Incorporated, Murray Hill and Berkeley Heights, N.J., a corporation of New York Filed Feb. 8, 1968, Ser. No. 703,930

Int. Cl. H01k *13/00;* H03f *3/38*

U.S. Cl. 330—10 8 Claims

ABSTRACT OF THE DISCLOSURE

In a high voltage modulation-demodulation amplifier, saturation of the output transformer is prevented in the presence of a signal with a variable D.C. mean value by sequentially activating a pair of amplifier circuits feeding opposite sides of the output transformer primary. Pulse coding is provided by an asynchronous delta modulation loop in which the minimum pulse width is controlled to limit power dissipation in active elements. Decoding is accomplished with a low pass filter.

This invention relates to amplifiers and more particularly to amplifiers of the modulation-demodulation type.

BACKGROUND OF THE INVENTION

In detection systems employing reflected wave energy, as in communications systems and in numerous other fields, low voltage signals over a broad range of frequencies must be amplified to high voltage before they are useful.

Field of the invention

Numerous amplification techniques are available for amplifying low voltage audio frequency signals. One method which is particularly useful involves coding the signal to be amplified into a high frequency signal, applying the high frequency signal to the input of a step-up voltage transformer and decoding the signal at the transformer output. An amplifier of this type does not require a high voltage power source nor a physically large output transformer and thus is particularly desirable. Such an amplifier may be constructed with solid state components for additional reliability and compactness.

Description of the prior art

Frequently, the signals which must be applied to an amplifier of this type are D.C. signals or low frequency signals with a D.C. component. The amplification of such signals by the coder-transformer-decoder method presents many difficulties. If such a signal is applied to a prior art amplifier of this kind, a high frequency coded signal including a D.C. component will appear at the transformer primary. Such signals create a flux in the transformer core which quickly saturates the core and interrupts normal operation of the amplifier. Consequently, present high voltage transformer amplifiers typically apply only zero means signals to the step-up transformer. In such amplifiers, variable mean signals are processed by separately amplifying the A.C. and D.C. components of a signal and recombining them at the output. Such processing necessitates the use of a high voltage power supply and thereby defeats one purpose of the step-up voltage transformer.

Accordingly, it is an object of the present invention to amplify variable mean signals to high voltage in a coding-decoding amplifier without the use of a high voltage power supply and without saturating the output transformer.

Further, early modulation-demodulation amplifiers generally modulated the input signal with a sinusoidal carrier signal of high frequency. More recent systems have employed pulse width and pulse amplitude modulators. Pulse carrier modulation improves the amplifier power efficiency, eliminates component nonlinearities and renders the system more immune to noise. However, prior pulse modulation-demodulation amplifiers are cumbersome and relatively inefficient. Pulse coding and decoding can be simplified if the information coded relates only to the change in the input signal between pulses. Such encoding is often referred to as delta-modulation.

Thus, a further object of the present invention is to simplify the circuitry and improve the efficiency of modulation-demodulation amplifiers.

Finally, amplifiers are often subjected to signals beyond the dynamic range for which they are designed. When such signals are applied, the amplifier is said to be overloaded. Many amplifiers require a period of time to recover from such overload condition. During this time, normal operation of the amplifier is interrupted.

Thus, it is a further object of this invention to amplify signals in such a way that recovery from overload is essentially instantaneous.

SUMMARY OF THE INVENTION

In attaining these and other objects, and in accordance with the invention, an input signal is transformed into a high frequency signal in a suitable coder. In a preferred embodiment the transformation may be accomplished in a delta-modulation feedback loop wherein the rate at which the coded pulse signal switches state is limited by control of the minimum pulse width of the signal. The coded signal is sequentially applied to opposite sides of the primary of a step-up voltage transformer at a rate of alternation selected in accordance with the output transformer's saturation characteristics. The transformer output is then rectified, and demodulated in a suitable demodulator which may be a simple low pass filter network. The amplifier may be adapted to use as a marking amplifier for marking electrosensitive paper by the addition of two selected inputs.

BRIEF DESCRIPTION OF THE DRAWING

The invention will be fully apprehended from the following description of illustrative embodiments thereof, taken in conjunction with the appended drawings in which:

The functional block diagram of FIG. 1 portrays the overall operation of an amplifier constructed in accordance with the invention. As shown in FIG. 1, a low voltage signal requiring amplification, $S(t)$, is applied to signal coder 10 where it is converted into a high frequency signal. Coder 10 may be a suitable modulator or pulse coder. The high frequency signal V(t) is then directed to a saturation-control step-up voltage transformer network, 11, where it is amplified in accordance with the invention. Network 11 typically includes a step-up voltage transformer with a center fed primary winding. Such a transformer will normally saturate in the presence of a D.C. signal or a signal with a D.C. mean value.

Saturation is prevented, in accordance with the invention, by sequentially applying the modulated or coder signal to opposite sides of the transformer primary at a predetermined rate of alternation. In this way the flux created in any one period is canceled by the opposing flux created in other periods. A preferred manner of achieving the desired sequential action is discussed hereinafter, particularly with reference to FIG. 3. The amplified coded signal is then applied to decoder 12 which produces an amplified replica of the input signal.

In a preferred embodiment of the invention, pulse carrier modulation may be employed for coding. If feedback path 13 is closed, as by closing switch 14, the pulse modulator becomes part of a delta-modulation loop including network 15. In such a loop the information conveyed from the coder to the decoder relates only to the change in the input signal between pulses.

Figure 1:
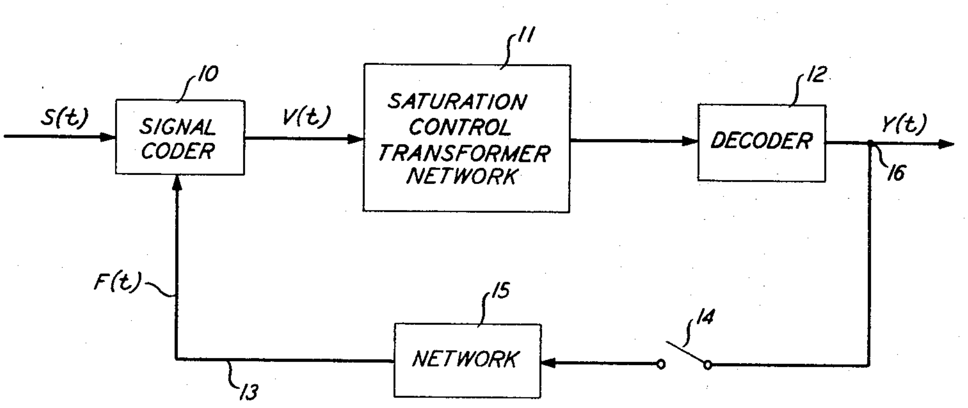
FIG. 1 is a block diagram of an amplifier constructed in accordance with the invention.
Figure 2:
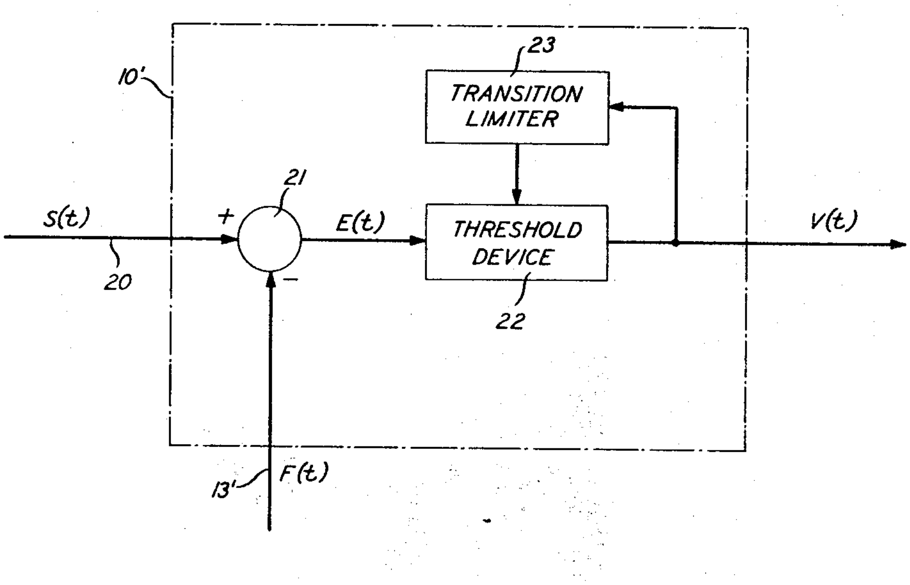
FIG. 2 is a block diagram of a modulator for use in an amplifier constructed in accordance with the invention.

The signal coder section of one such possible delta-modulation loop is shown in FIG. 2. In this system, the signal to be amplified, S(t), is applied via input signal channel 20 to the positive input terminal of subtracting network 21 within coder 10'. Simultaneously, an attenuated feedback signal, derived from the output signal Y(t) at point 16 (FIG. 1) and proportional to that output signal, is applied to the negative input of network 21 from network 15 (also FIG. 1). Network 15 may be a common resistive voltage divider, the resistance ratio of which may be varied to control the gain of the amplifier. The output of subtracting network 21, E(t), is thus an "error" signal and is proportional to the difference between the input signal S(t) and the feedback signal F(t). The error signal represents the change in the input signal in the time between pulses.

The error signal, E(t), is directed to threshold device 22 which provides a rectangular wave or "pulse train" output signal, V(t), with zero crossings which depend on E(t). The operation of transition limiting network 23 ensures a minimum pulse width in V(t) which will keep power dissipation of active devices in the circuit within a safe level. Taken together, networks 11, 12, and 15 (FIG. 1) together with subtractor 21 and networks 22 and 23 (FIG. 2) comprise a delta-modulation loop with a high frequency pulse modulated signal in its forward path and an attenuated analog signal in its feedback path.

Figure 3:
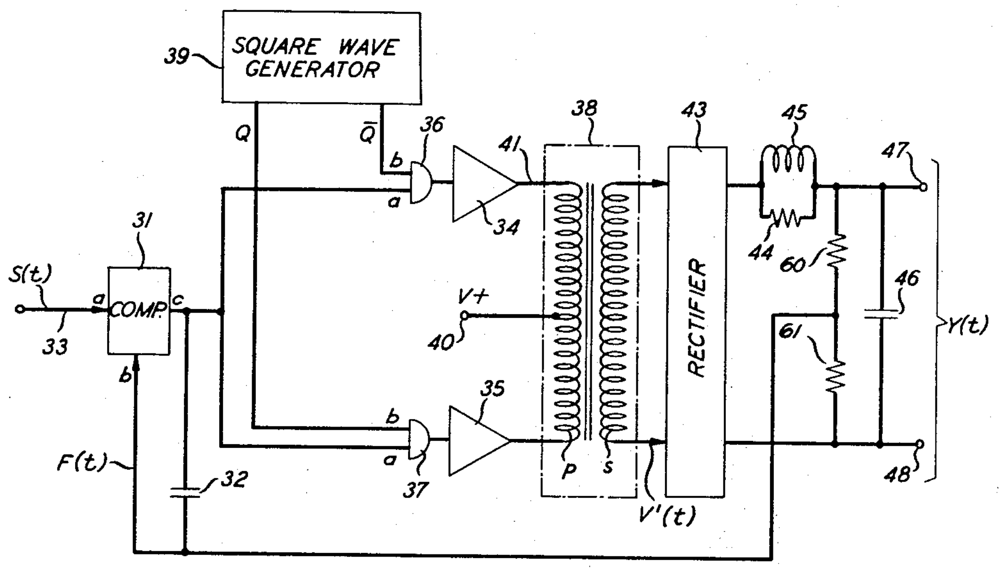
FIG. 3 is a schematic circuit diagram of an amplifier constructed in accordance with the invention.

FIG. 3 shows a circuit diagram of a preferred embodiment of the invention. The coding function of networks 10 and 10' in FIGS. 1 and 2 is accomplished by comparator 31, capacitor 32 and the resistive network including resistors 60 and 61 in the embodiment shown in FIG. 3. Input signal, S(t), is applied to voltage comparator 31 by means of signal channel 33. Comparator 31 is a device which produces a binary output voltage of plus $h$ or zero volts and may be, for example, a Fairchild 710A differential voltage comparator. The comparator output signal is plus $h$ when the voltage applied to the positive terminal of the comparator at point 31$a$ exceeds the voltage applied to the negative terminal of the comparator at point 31$b$. The output signal is zero when this condition is reversed and the voltage at 31$b$ exceeds the voltage at 31$a$. F(t), the signal applied to the negative comparator input terminal at 31$b$, is an attenuated replica of the amplifier output signal Y(t). F(t) is derived from Y(t) by means of resistors 60 and 61 which divide the output voltage Y(t) in accordance with the ratio of their resistances. The magnitude of F(t) and thus the gain of the amplifier can be adjusted by varying the resistance ratio of resistors 60 and 61.

Capacitor 32 is connected across comparator 31 from input 31$b$ to output 31$c$. It limits the switching rate of the modulated pulse carrier. The operation of this portion of the circuit can best be described by observing its response to different input conditions.

When the input signal S(t) is smaller than the feedback signal F(t), the output of comparator 31, V(t), is zero volts. When V(t) is at this low state, the amplifier output Y(t) decays with its own time constant, capacitor 32 discharges through resistors 60 and 61, and F(t) decreases. When S(t) exceeds F(t) the comparator changes state, V(t) becomes plus $h$ and the amplifier output Y(t) increases. Since the capacitor voltage cannot change instantaneously, F(t) is raised to plus $h$ volts at transition time and then starts to decay toward Y(t). When the decreasing F(t) goes below S(t) the voltage comparator changes state again, Y(t) decays and the cycle repeats. The output of this circuit, V(t), is thus a high frequency modulated carrier signal.

The output of comparator 31, V(t), is alternately applied applied to the input terminals of noninverting amplifiers 34 and 35 through AND gates 36 and 37 at a predetermined rate of alternation. These amplifier circuits deliver an amplified modulated signal first to one side of the primary winding of transformer 38 then to the opposite side. Each amplifier may comprise a pair of transistors connected in the grounded emitter configuration.

The rate of alternation between amplifier 34 and 35 is controlled by square wave generator 39 and gates 36 and 37. Square wave generator 39 supplies two signals Q and $\overline{Q}$. Q is a simple square wave and $\overline{Q}$ is the inverse wave form. The first output of the square wave generator 39 is applied to gate 37 and the second is applied to gate 36. Gates 36 and 37 are each designed, in effect, to pass the inverse of the signal applied to a first of their terminals, designated terminal $a$, when a "high" or positive signal is applied to a second terminal, designated terminal $b$, and to pass no signal when a "low" or zero signal is applied to terminal $b$. The modulated carrier V(t) is applied simultaneously to input terminals $a$ of gates 36 and 37. When Q changes state to zero, $\overline{Q}$ becomes positive. In this situation gate 36 passes the inverse of the signal V(t) and gate 37 blocks the signal. This alternation continues at a rate such that gate 36 is "open" for a period T, then "closed" for a period T, while gate 37 is closed when gate 36 is open and open when gate 36 is closed.

Square wave generator 39 may include an astable multivibrator of nonlocking design where both transistors cannot be on simultaneously. Such multivibrator circuits are variously described, for example, in Millman and Taub, Pulse, Digital, and Switching Waveforms, McGraw-Hill Book Company, New York, 1965 at pages 438 to 451 and 891. The multivibrator output may be connected through a flip-flop, connected in the toggle mode. The flip-flop divides the multivibrator frequency by 2, ensuring a fifty percent duty cycle, and provides both Q and $\overline{Q}$.

Transformer 38 is a step-up voltage transformer of any well-known design. It contains a primary winding 38$p$, center fed by a suitable voltage supply $V^+$ (not shown) at point 40, and a secondary winding 38$s$. Voltage supply $V^+$ need not be well regulated. If a D.C. signal is applied to one side of the primary winding, for example, at point 41, for a time 0 to $t$ sec., and the same signal is applied to the opposite side of the primary winding at point 42 for a similar time $t$ to $2t$ sec., then the total core flux after $2t$ seconds will be zero; the one flux having been canceled by the other. Similarly, the flux will be zero if a sufficiently high frequency signal having a constant mean value in the period 0 to $2t$ seconds is applied to the primary in a similar manner. The difficulty arises when an amplified modulated pulse signal used to energize the transformer typically is a high frequency signal which does not have a constant mean value. In this case the flux created in two adjacent time intervals will not cancel completely and saturation may occur.

This difficulty is overcome in accordance with the invention by alternately applying an amplified signal to opposite sides of the primary at a rate of alternation such that each side of the primary is activated for a specifically preselected time interval T. T is selected so that if the maximum signal voltage which can be applied to the transformer 38, in the operation of the amplifier, were applied to one side of the primary for a period T the transformer would not saturate. When T is selected in this way, the transformer will never saturate so long as $V(t)$ is not periodic in 2T. This limiting condition can be easily avoided.

As should be apparent, the preselected interval T is the same "T" referred to in conjunction with the square wave generator 39 and gates 36 and 37. The interval is determined by consulting the known saturation characteristics of transformer 38; square wave generator 39 is adjusted accordingly.

The output of transformer 38 is thus an amplified replica, $V'(t)$, of the modulated pulse signal $V(t)$. However, this replica is inverted every T seconds as a result of the alternate application of $V(t)$ to opposite sides of the transformer primary. Consequently the transformer output is rectified in full wave rectifier 43 before decoding. Rectifier circuit 43 may include any standard rectifier configuration.

The delta modulation system employed in this embodiment of the invention permits the amplified replica of $V(t)$ to be demodulated in a simple low pass filtering network. However, full wave rectifier 43 may produce a nonlinear driving impedance. Thus, the low pass arrangement employed is an RCL filter in which resistor 44 is connected across inductor 45 and in which capacitor 46 is converted across the output load. The output of the amplifier is taken between points 47 and 48 across capacitor 46.

Figure 4:
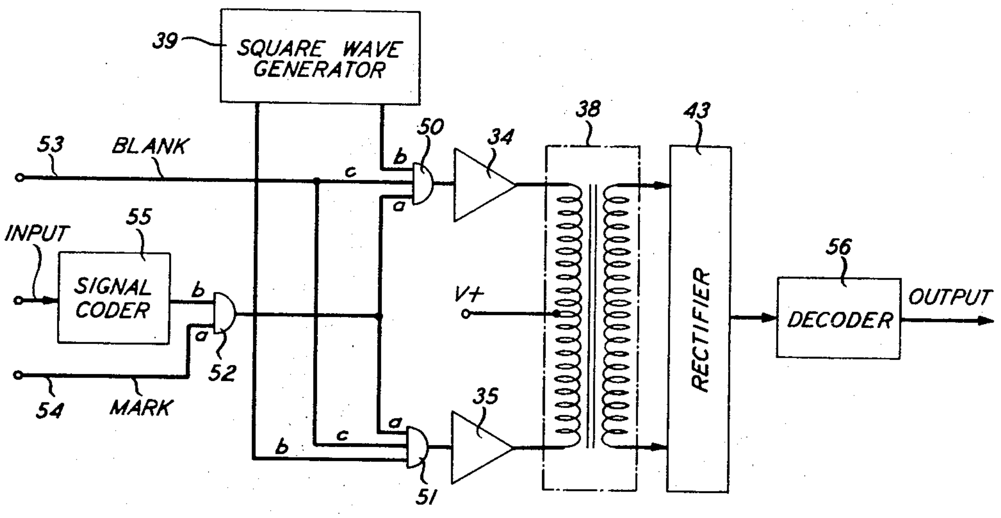
FIG. 4 is a schematic diagram of an amplifier for marking electrosensitive paper constructed in accordance with the invention.

In an alternate embodiment of the invention, shown in FIG. 4, additional inputs are provided to adapt the amplifier for electrosensitive paper marking. Electrosensitive paper marking systems are well-known in the prior art. Such systems convert electrical signals into graphical traces on specially prepared paper. Voltages on the order of 50 to 500 volts are typically required to produce satisfactory traces. However, the output signals generated by devices which could profitably employ such paper displays may be in the range of one to five volts. Such devices require a marking amplifier to step up the voltage of the signals they produce.

In marking electrosensitive paper, two signals in addition to the signal to be recorded may be required; a mark signal and a blank signal. The blank signal instructs the display device not to write when the marking pen is in the retrace or return mode. The mark signal is a command to write as black as possible and is used when calibration marks are desired. An amplifier may be constructed in accordance with the invention to fill this need.

A circuit for such an amplifier is shown in FIG. 4. This circuit is similar to that shown in FIG. 3 except that gates 36 and 37, appearing in FIG. 3, have been replaced by gates 50 and 51, and OR gate 52 and signal channels 53 and 54 are provided for interconnection to the output of a device adopted for electrosensitive paper marking. The "blank" signal is applied to signal channel 53 by which it is directed to contact C on gates 50 and 51. Contact C operates as an overriding control. When no signal is present at point C of gates 50 and 51, the gates operate as gates 36 and 37 described in conjunction with FIG. 3. When a "blank" signal is present in channel 53, gates 50 and 51 "close," pass no signal, and no output signal appears at the output of decoder 56. The mark signal is applied to terminal *a* of OR gate 52 by means of signal channel 54. The modulated carrier signal representative of $S(t)$ is supplied from signal coder 55, which may be any appropriate coding device to terminal *b* of gate 52. Gate 52 is constructed to pass the signal at terminal *b* when the mark signal is not present at terminal *a*. At this time amplifiers 34 and 35, transformer 38 and rectifier 43 operate as described in conjunction with FIG. 3. When a mark signal is present a voltage is assumed out of gate 52, amplifiers 34 and 35 work without interruption by the signal coder 55, and the output would reach the maximum D.C. voltage, which is determined strictly by the supply voltage, $V^+$ (40 on FIG. 3) and by the transformer turns ratio. Coder 55 and decoder 56 may employ any suitable coding and decoding method.

It is to be understood that the above-described arrangements are merely illustrative of the application of the invention. For example, two zero mean signals 180 degrees out of phase with one another may be continuously applied to opposite sides of the transformer primary. In this situation the flux created by the first signal in a given time period, 0 to *t* seconds, will exactly cancel the flux created by the second signal in the same time period, 0 to *t* seconds, when the applied signals have a constant D.C. mean value. When the D.C. mean of the applied signals is nonzero, the two signals may be periodically switched with one another at a predetermined rate to avoid saturation.

What is claimed is:

1. An amplifier comprising, coder means supplied with an input signal for producing a coded carrier signal, a step-up voltage transformer with a primary winding and a secondary winding, means for sequentially directing said coded carrier signal to opposite ends of said primary winding according to a predetermined sequence, rectifier means connected to said secondary winding, and decoder means connected to said rectifier means.

2. An amplifier as defined in claim 1 wherein said predetermined sequence is such that said coded carrier signal is applied to one side of said primary for a fixed interval, then to the opposite side of said primary for an equal fixed interval.

3. An amplifier as defined in claim 2 wherein said fixed interval is selected in accordance with the saturation characteristics of said transformer such that the maximum voltage present in said coded carrier signal is not sufficient to saturate said transformer during said fixed interval.

4. An amplifier as defined in claim 1 wherein said means for sequentially directing said coded carrier signal comprises a first gate which upon actuation directs said coded carrier signal to a first end of said transformer primary, a second gate which upon actuation directs said coded carrier signal to a second end of said transformer primary, and means for alternately actuating said gates.

5. An amplifier as defined in claim 4 wherein said means for sequentially directing said coded carrier signal further comprises, a first amplifier for amplifying said coded carrier signal when said signal is directed to said first end of said transformer primary, and a second amplifier for amplifying said coded carrier signal when said signal is directed to said second end of said transformer primary.

6. An amplifier as defined in claim 1 wherein said coder means comprises a delta modulation loop in which the minimum pulse width of said coded signal is controlled.

7. An amplifier as defined in claim 1 wherein said coder means comprises a feedback channel, a voltage comparator and a capacitor, said feedback channel being directed to a first input terminal of said comparator, said input signal being directed to a second input terminal of said comparator, and said capacitor being connected between said first input terminal and the output terminal of said comparator.

8. An amplifier for processing relatively slow varying signals comprising, a transformer, means for coding said relatively slow varying signals, gating signal generating means for generating a plurality of sequentially related gating signals, and a plurality of gates responsive to said gating signals for sequentially applying said coded signal to a plurality of selected points on said transformer at a rate which is selected in accordance with the saturation time of said transformer.

References Cited

UNITED STATES PATENTS

| | | | |
|---|---|---|---|
| 2,872,582 | 2/1959 | Norton | 307—240 X |
| 3,227,892 | 1/1966 | Basham | 307—240 |
| 3,264,491 | 8/1966 | Davis | 307—240 |
| 3,309,527 | 3/1967 | Walker | 307—240 |
| 3,430,073 | 2/1969 | Leonard | 307—262 X |

NATHAN KAUFMAN, Primary Examiner

U.S. Cl. X.R.

307—240; 330—59, 84, 195